May 9, 1961 J. W. BARTH 2,983,095
GRASS CATCHER
Filed Oct. 2, 1959

INVENTOR:
JOHN W. BARTH
BY: Arthur J. Hansmann
ATTORNEY

United States Patent Office 2,983,095
Patented May 9, 1961

2,983,095
GRASS CATCHER

John W. Barth, Cudahy, Wis., assignor to Jacobsen Manufacturing Co., Racine, Wis., a corporation of Wisconsin Filed Oct. 2, 1959, Ser. No. 844,119

8 Claims. (Cl. 56—202)

This invention relates to a grass catcher for a lawn mower and it particularly relates to a catcher for a mower of the rotary type.

It is an object of this invention to provide a grass catcher which is mountable behind a rotary type mower and below the handle thereof and which can be easily mounted onto the mower and removed therefrom for the necessary requirements of emptying the catcher during the course of mowing.

Another object of this invention is to provide a grass catcher which is easily manipulated and which is enclosed in the operating position, but which can be readily opened for the purpose of emptying the clippings therefrom.

Still another object of this invention is to provide a grass catcher which can be made from light weight and inexpensive material such as plastic, but which nevertheless is sufficiently rigid and locked together into two closed sections for operating purposes.

Still another object of this invention is to provide a grass catcher which is easily carried and which is easily opened and closed for emptying purposes, and this particular object is accomplished through the employment of a handle which also serves as the means for locking two sections of the catcher together. Thus, the operator need only hold the handle for the purpose of carrying the catcher and upon pulling on the handle to release it from its locked position, the catcher will automatically open for the purpose of emptying the clippings therefrom.

Still another object of this invention is to provide a grass catcher which receives the stream of air normally discharged from a rotary mower, but which particularly baffles the air in its path of travel through the catcher so that the air will be easily passed through the catcher while depositing the clippings therein.

Other objects and advantages will become apparent upon reading the following description in light of the accompanying drawings wherein.

The same reference numerals refer to the same parts throughout the several views.

Figure 2:
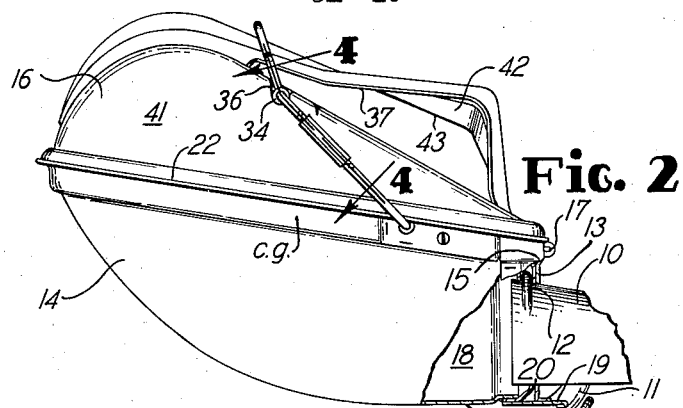
Fig. 2 is a side elevational view of that shown in Fig. 1 with a part thereof broken away and with a discharge spout of the mower fragmentarily shown.

The drawings show the catcher mountable onto a mower which is shown in Fig. 2 to include a rear discharge spout 10 located adjacent the mower rear wheel 11. The spout 10 has an upstanding flange 12 which is engaged by a depending flange 13 on the front 15 of the catcher so that the latter is mountable on the chute 10 and is held thereon by means of the lip 12. The catcher flange 13 defines a front opening 20 in the catcher, which opening is available for receiving the spout 10. This arrangement is of no particular importance in the present invention and it is shown in U.S. Patent application, Serial No. 47,669 and now Patent No. Des. 184,324. It will thus be understood that the mower spout 10 discharges the usual stream of air through the spout 10 and into the catcher, and this is done in a conventional manner.

Figure 3:
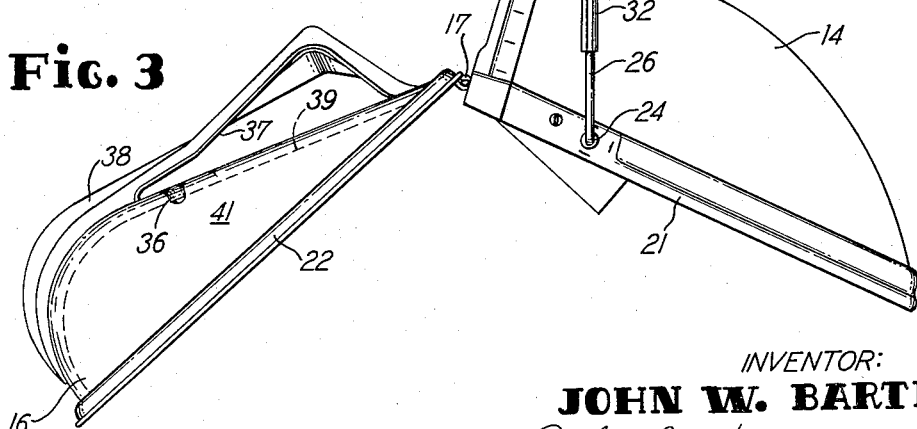
Fig. 3 is a side elevational view of the catcher shown in Fig. 1, but showing the same in the open position.

The catcher consists of a lower section 14 and an upper section 16 which are hinged together through the hinge 17 along the front 15 thereof. Of course, it will also be understood that the catcher has a hollow interior 18 extending throughout the sections 14 and 16 when they are in the closed positions shown in Figs. 1 and 2. It will be further noticed that the lower section 14 has a lip 19 which extends below the mower spout 10 when in the assembled Fig. 2 position. The upper edge 21 of the lower section 14 is formed to be slightly smaller in perimeter than the lower edge 22 of the upper section 16. Thus, the edge 21 nests within the flanged edge 22 when the catcher is in the Fig. 2 position so that the entire joint formed by the edges 21 and 22 is virtually an air-tight joint in the catcher. Of course, it will also be understood that the sections 14 and 16 can be swung apart as shown in Fig. 3 and in this position the grass clippings could be readily emptied from the interior 18 of the catcher. In so swinging the sections, the user would hold the flanged edge 22 at the rear of the catcher, where he thus has a hand grip, and he would hold the handle 23.

Figure 1:
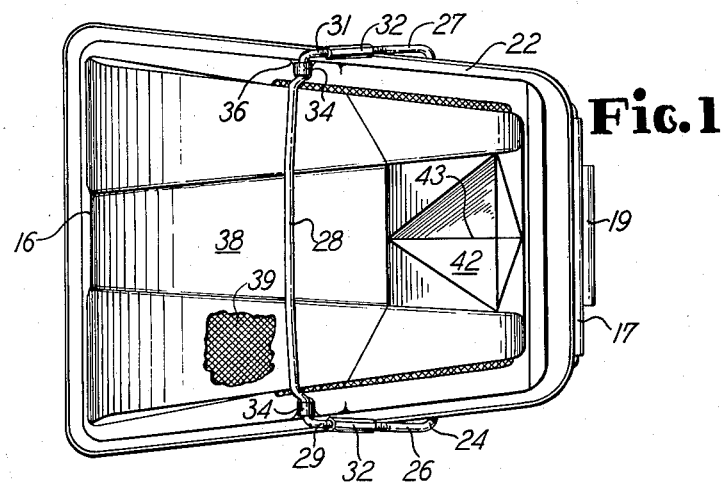
Fig. 1 is a top plan view of a preferred embodiment of the catcher of this invention.

The main feature of this invention with regard to the opening and closing of the catcher resides in the provision of a bail type of handle 23 which is a latching member and is pivotally attached at the inturned ends 24 of the lower or free ends of the U-shaped bail 23 to the catcher lower section 14. Further, the axis of pivot of the U-shaped handle 23 is shown to be offset from the center of gravity indicated to be on the axis designated "c.g." of the catcher, and it is offset from the hinge 17 to be between c.g. and the hinge 17 for the purpose of permitting free swinging or automatic swinging of the lower section 14 when the clippings are to be emptied from the catcher. The handle 23 includes the end pieces 26 and 27, both of which have the inturned ends 24 for the purpose of providing the pivoted mounting to the lower section 14 as mentioned. Fig. 1 shows the handle 23 also includes the intermediate portion 28 which extends across the width of the catcher and provides a hand grip with its two ends 29 and 31 respectively attaching to the parts 26 and 27 in a manner described hereinafter.

Figure 4:
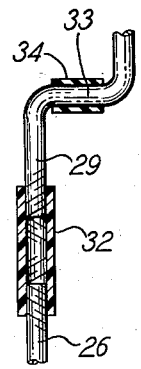
Fig. 4 is an enlarged sectional view taken along the line 4—4 of Fig. 2.

Fig. 4 particularly shows that the parts 26 and 27 have threaded legs or ends while the ends 29 and 31 of the cross piece of the handle 23 also have threaded ends 30 and 35, but these latter ends are threaded oppositely to the disposition of the threads on parts 26 and 27. A turnbuckle 32 is self-threaded into the parts 26, 27 and 28 so that the respective ends of the handle 23 are joined together by the turnbuckle 32 as shown. It is preferred that the turnbuckle 32 be made of a soft material, such as plastic or the like and that it be provided with flat faces, such as the hexagonal shape shown, all for the purpose that the turnbuckle 32 can be threaded onto the ends 26 and 29, for instance, and thus join these two ends together. Then, if it is desired that the ends 26 and 29 be drawn closer together, additional rotation of the turnbuckle 32 will permit the ends to be moved toward each other while rotation of the turnbuckle 32 in the opposite direction will cause the legs or ends 26 and 29 to move away from each other. In this particular manner, the lengths of the two legs 26, 29 and 27, 31 on opposite sides of the U-shaped handle 23 can be readily and easily adjusted to compensate for manufacturing tolerances and wear and also for flexibility of parts. At this time it should be understood that the catcher sections 14 and 16 are preferably made of a plastic material which is inherently slightly flexible, since it is of a thin material, and thus the handle 23 can be adjusted as described to compensate for the flexibility in the catcher.

An important feature of the handle 23 is the provision of the offset portion 33, which is formed in both of the ends 29 and 31 of the handle piece 28. Also, the portion 33 supports a sleeve or roller 34 which is rotatable on the portion 33 for a purpose mentioned hereinafter. Fig. 3, particularly shows that the catcher upper section 16 is provided with a notch 36 which is a latch mating member and is open in an upward direction away from the pivot axis of the handle 23. A notch 36 is provided on each side of the catcher as shown in Fig. 1 and the notch is located to receive the rollers 34 mounted on the handle cross part 28.

With this arrangement, it will then be understood that the handle 23 can be adjusted in length by means of the turnbuckle 32 so that the rollers 34 will engage the notches 36 to snugly secure the catcher sections 14 and 16 together along their respective edges 21 and 22, so that the catcher is air-tight therealong. Also, the connection of the rollers in the notches is such that the handle can be used for carrying the catcher.

Still another feature of the catcher is the guiding or baffling of the air which flows through the catcher from the point of entering the catcher through the mower spout 10 and to the point of discharging from the catcher through the openings 37 with one such opening located on each side of the mower top 38. At this time it will also be noticed that the catcher upper section 16 has a screen 39 extending between the sides 41 of the top section 16 and the screen is thus located below the opening 37 in the upper section 16 to intercept the clippings of grass which are blown into the catcher through the spout 10. The top 38 is provided with an indent or air baffle 42 which has an apex 43 extending longitudinally of the catcher and therefore substantially parallel with the openings 37 and being located downwardly toward the center of the catcher so that air flowing out the top of the catcher will be baffled and guided by the section 42 to be directed toward both openings 37. In this manner, the air is streamlined in its flow out of the catcher, and thus the movement of air through the catcher is improved. Further, the discharge of air from the catcher is only in a lateral direction with respect to the fore-and-aft axis of the catcher and thus the air is not blown up into the operator's face or in any other undesirable location. In this particular arrangement of catcher handle and discharge openings, it will be noted that the handle does not interfere with the openings 37, but rather is placed substantially out of the line of the openings 37 so that full flow of air can be achieved.

It will now be seen that the bail of handle 23 and the upper surface 38 of the catcher top 16 are both arranged so that the side openings 37 are of adequate size to permit air to exhaust air from the catcher, and yet the bail 23 is able to be swung over the top 38 for purposes of emptying the catcher. Further, with reference to Fig. 2, it will be appreciated that the handle 23 snaps into the locking position shown, and in order to accomplish this, the flexibility of the catcher is utilized. Thus, when the handle is being pivoted into the locked position of Fig. 2, the rollers 34 pass into the notches 36 by slightly deflecting the sides of the catcher so that the handle will reach its seated position shown in Fig. 2. It has further been found that this flexibility of the catcher material is adequate to maintain the handle in the locked position shown.

While a specific embodiment of this invention has been shown and described, it should be obvious that certain changes can be made in the above, and should therefore be limited only by the scope of the appended claims.

What is claimed is:

1. A grass catcher for a lawn mower, comprising an upper section and a lower section attached along one side of said catcher for assuming an opened and a closed position and having an enclosed hollow interior for the storage of grass clippings, a U-shaped bail handle pivotally attached at the free ends thereof to two opposite sides of said lower section on a pivot axis intermediate the center of gravity of said catcher and said one side of said catcher, said handle being sufficiently long to be pivotal over a part of both said sections including the bottom of said lower section and with the intermediate portion of said handle being swingable over and extending across said upper section in the closed position, said upper section having two spaced-apart notches being open in the direction away from the pivot axis of said handle, said handle including an offset portion on each leg of the U-shape thereof and said portions being directed inwardly toward each other and being located on said handle to engage said notches in the closed position and be removable therefrom upon pivoting of said handle.

2. A grass catcher for a lawn mower, comprising mating sections hingedly attached together along a hinge axis thereon and having a hollow interior for the storage of grass clippings, said sections being constructed of solid material of plastic or the like having a slight degree of flexibility, a U-shaped bail handle pivotally attached at the free ends thereof to two opposite sides of one of said sections and on a pivot axis intermediate said hinge axis and the center of gravity of said catcher, said handle extending across the other of said sections and the latter having two notches therein open in the opposite direction with respect to the direction therefrom toward said pivot axis of said handle, said handle including two offset portions respectively engaged in said notches and being removable therefrom for hingedly swinging said sections into an open position, said handle being separated in two pieces on each leg of the U-shape thereof and with the separations being located between said pivot axis and said offset portions, adjustable means attached to each said two pieces for selectively moving the latter toward and away from each other to adjust for manufacturing tolerances and variations in the flexible material of said sections in locating said offset portions snugly in said notches.

3. A grass catcher for a lawn mower, comprising an upper section and a lower section mated together and having a hollow interior for the storage of grass clippings and for the passage of an air stream therethrough, means interconnected between said sections for releasably securing said sections together in airtight relation, said upper section having an exhaust opening therein for the escape of exhaust air from said interior and said upper section including a top disposed above said opening, a screen disposed on said upper section below said top and in the path of said exhaust air for intercepting grass clippings being conveyed in the escaping air, and an air baffle disposed on said upper section and to the side of said screen downstream in the path of said exhaust air for guiding the latter through said opening.

4. A grass catcher for a lawn mower, comprising mating sections hingedly attached together along a hinge axis thereon and having an enclosed hollow interior for the storage of grass clippings when said sections are mated together in a closed position, a latching member movably attached to one of said sections at a selected location thereon and extending to the other of said sections, said other of said sections having a latch mating member thereon, and a latching portion on said latching member and releasably engaged with said latch mating member to lock said sections together and being movable away from said latch mating member to release said sections to a hingedly movable condition, said selected location on said one of said sections being intermediate said hinge axis on said sections and the center of gravity of said catcher for emptying said clippings from said sections upon release of said sections and holding of said latching member.

5. A grass catcher for a lawn mower, comprising an upper section and a lower section hinged together along one side thereof and mated together and having an enclosed hollow interior for the storage of grass clippings, said upper section including a flanged edge to present a hand grip on the side thereof opposite said side with the hinge, a U-shaped bail handle pivotally attached at the free ends thereof to two opposite sides of said lower section on a pivot axis theron intermediate the axis of the hinge and the center of gravity of said catcher and with the intermediate portion of said handle being swingable over and extending across said upper section and spaced therefrom in a hand grip portion, said upper section having two spaced-apart handle engaging portions on opposite sides thereof, said handle including means on each leg of the U-shape thereof and being spaced therealong to engage said portions and be releasable therefrom upon pivoting of said handle.

6. A grass catcher for a lawn mower, comprising sections hingedly attached together and mated along juxtaposed edges thereon and having an enclosed hollow interior for the storage of grass clippings when said sections are mated together in a closed position, a two-piece handle pivotally attached at one end portion of one piece of said two-piece handle to opposite sides of one of said sections and immediately adjacent said edge of said one of said sections and on an axis intermediate the center plane of said edge and the hinge thereon, said handle extending at the other end portion of the other piece to the other of said sections, means interconnected between and joining said pieces of said two-piece handle together for selectively moving them toward and away from each other, said other of said sections having a latching portion thereon, and a latch engaging portion on said handle for movement into engagement with said latching portion to lock said sections together and for movement out of engagement with said latching portion to release said sections to a hingedly movable condition.

7. A grass catcher for a lawn mower, comprising an upper section and a lower section mated together and having a hollow interior for the storage of grass clippings and for the passage of a stream of air therethrough, a handle pivotally attached to said lower section and extending across said upper section, a portion on said handle for engaging said upper section to releasably secure said sections together in air-tight mated relation, said upper section having two laterally spaced-apart side openings therein for the escape of air from said interior, a screen disposed across said upper section in a plane below said side openings and being in the air-upstream position from said openings for intercepting grass clippings being conveyed in the escaping air of said stream, and an air baffle disposed in the top of said upper section on the upright plane between said side openings therein and in the air-upstream position from said side openings for guiding the escaping air toward said openings.

8. A grass catcher for a lawn mower, comprising an upper section and a lower section mated together and having a hollow interior for the storage of grass clippings, means interconnected between said sections for releasably securing said sections together in air-tight relation, said upper section having two laterally spaced-apart side openings therein for the escape of air from said interior, a screen attached to said upper section and disposed thereacross below said side openings for intercepting grass clippings being conveyed in the escaping air, and said upper section including an indented portion having an apex extending longitudinally of said catcher and disposed on the airstream downstream side of and above said screen and in the upright plane between said side openings for guiding the escaping air toward said openings.

References Cited in the file of this patent
UNITED STATES PATENTS

| | | |
|---|---|---|
| 597,051 | Danz | Jan. 11, 1898 |
| 1,727,087 | Wendle | Sept. 3, 1929 |
| 2,361,637 | Lathrop | Oct. 31, 1944 |
| 2,747,356 | Peterson | May 29, 1956 |
| 2,783,604 | Cahill | Mar. 5, 1957 |
| 2,851,844 | Bailey | Sept. 16, 1958 |
| 2,855,745 | Phelps | Oct. 14, 1958 |